(No Model.)
C. W. ABBOTT.
GRAPPLE HOOK.
No. 479,871. Patented Aug. 2, 1892.
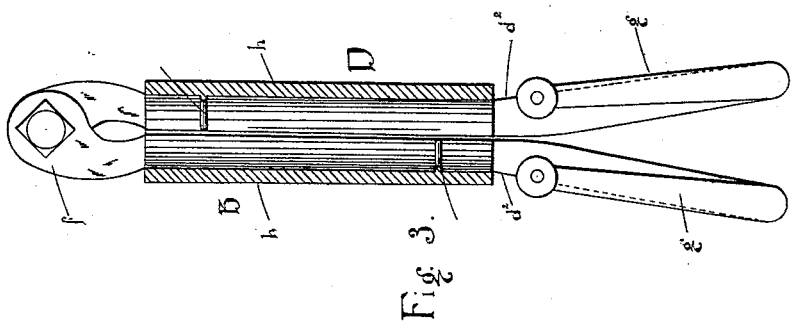
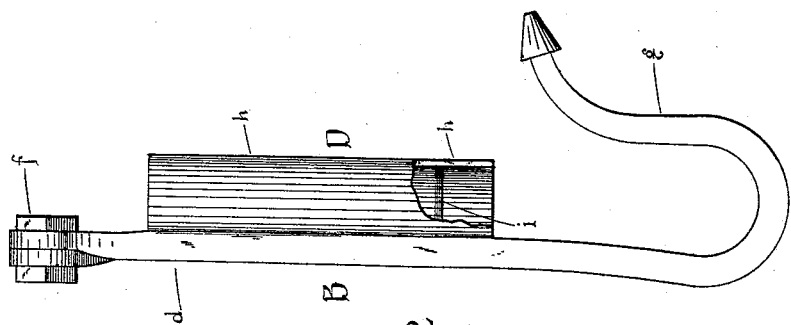
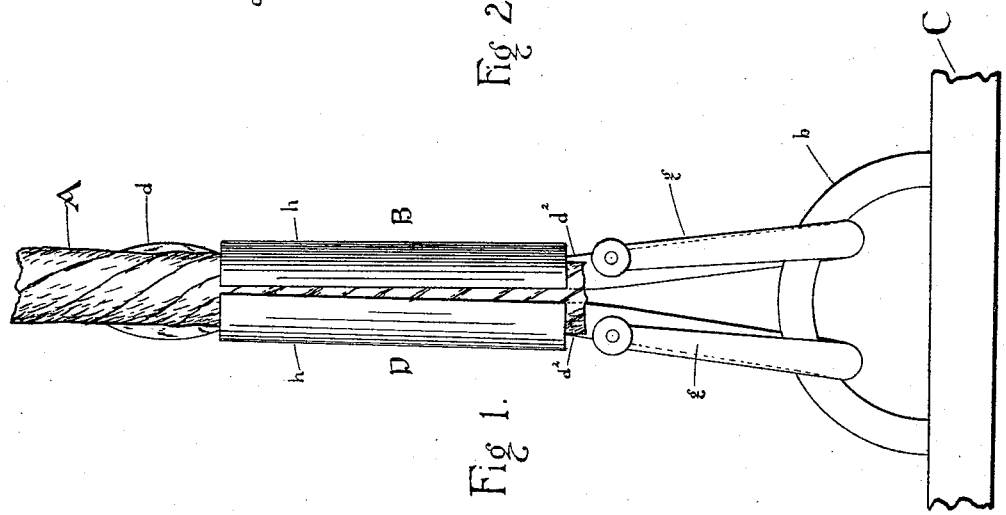
WITNESSES.
INVENTOR
Charles W. Abbott,
By C. A. Shaw & Co.,
ATTY

UNITED STATES PATENT OFFICE.

CHARLES W. ABBOTT, OF ALBION, MAINE.

GRAPPLE-HOOK.

SPECIFICATION forming part of Letters Patent No. 479,871, dated August 2, 1892.

Application filed April 4, 1892. Serial No. 427,674. (No model.)

*To all whom it may concern:*

Be it known that I, CHARLES W. ABBOTT, of Albion, in the county of Kennebec, State of Maine, have invented certain new and useful Improvements in Grapples, of which the following is a description sufficiently full, clear, and exact to enable any person skilled in the art or science to which said invention appertains to make and use the same, reference being had to the accompanying drawings, forming part of this specification, in which—

Figure 1 is a plan view showing my improved hook in use; Fig. 2, a side elevation of the hook detached, and Fig. 3 a longitudinal section through the rope-hold.

Like letters of reference indicate corresponding parts in the different figures of the drawings.

My invention relates especially to a grapple iron or hook for securing a drag-rope to an object; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the rope, B the hook considered as a whole, and C the whiffletree, which is provided with an ordinary eye or loop $b$.

The hook consists of two arms $d$, pivoted or hinged together at $f$, the outer ends of said arms being curved or bent upon themselves to form hooks proper $g$. The arms $d$ are bent laterally at $d^2$, so that their hook ends $g$ are hinged at a slight angle to the shanks of said arms and tension thereon would cause the arms to bind together.

On each shank a plate $h$ is secured longitudinally, said plates being semicircular in cross-section and forming together a socket D for the rope A. On the inner faces of these semicircular plates or socket members one or more bosses $i$ may be formed to indent the rope and prevent it from slipping.

In the use of my improvement the arms are thrown open and the drag-rope A inserted in the clamping-socket D. The hook ends $g$ are then inserted in the eye $b$ or to any other support from or to which power is to be transmitted. The strain on the hooks causes the members of the clamping-socket D to bind tightly on the rope, securing the grapple firmly thereto. The greater the strain the more tightly said grapple will grasp the rope.

By this construction all necessity of knotting the rope to secure it to the hook is avoided and the hook is easily adjustable in any desired position in a manner which will be readily understood by all conversant with such matters without a more explicit description.

Having thus explained my invention, what I claim is—

1. A grapple iron or hook comprising two pivoted diverging arms provided with hooks at their outer ends and two approximately semi-cylindrical members, each mounted longitudinally on the shank of one of said arms, said semi-cylindrical members forming a clamping-socket which closes tightly as the hooks are sprung together under the strain of the load, substantially as set forth.

2. A grapple iron or hook comprising two pivoted diverging arms provided with hooks at their outer ends and two approximately semi-cylindrical corrugated members, each mounted longitudinally on the shank of one of said arms, said semi-cylindrical members forming a clamping-socket which closes tightly as the hooks are sprung together under the strain of the load, substantially as set forth.

CHARLES W. ABBOTT.

Witnesses:
GEO. H. CROSBY,
CARROLL W. ABBOTT.